United States Patent [19]
Boulanger et al.

[11] 3,935,511
[45] Jan. 27, 1976

[54] CURRENT INRUSH LIMITER

[75] Inventors: Henry J. Boulanger, Cumberland, R.I.; Theodore Brassard, Berkley, Mass.

[73] Assignee: Texas Instruments Incorporated, Dallas, Tex.

[22] Filed: Dec. 26, 1973

[21] Appl. No.: 428,560

[52] U.S. Cl. .................... 317/20; 317/31; 317/41; 317/50
[51] Int. Cl.² ......................................... H02H 9/00
[58] Field of Search ............ 317/16, 20, 49, 31, 50, 317/41, 11 C

[56] References Cited
UNITED STATES PATENTS

| | | | |
|---|---|---|---|
| 1,335,507 | 3/1920 | Kazenmaier | 317/41 X |
| 3,323,017 | 5/1967 | Powell et al. | 317/20 |
| 3,555,361 | 1/1971 | Hallberg | 317/20 |

*Primary Examiner*—James D. Trammell
*Attorney, Agent, or Firm*—John A. Haug; James P. McAndrews; Russell E. Baumann

[57] ABSTRACT

Single or multi phase A.C. power is rectified to yield a D.C. voltage which is adapted to operate an electrical load. At "turn-on" a resistive device is inserted in series with the load until a voltage sensitive relay is energized to close its contacts or an SCR is energized to shunt the resistive device out of the circuit. The resistive device is preferably a PTC element. Several versions include circuitry for reinserting the PTC when the D.C. voltage drops excessively, an indication of impending current surge.

9 Claims, 6 Drawing Figures

CURRENT INRUSH LIMITER

SUMMARY OF INVENTION

This invention relates generally to limiting current surges, especially at turn-on during the charging of D.C. filtering capacitors or other transient high current conditions. More particularly, this invention contemplates providing a resistive device in series with the filter capacitor and the load at initial turn-on and removing the device from the circuit when the current inrush condition has passed. The resistive device preferably comprises a PTC device that is a semiconductive component having an anomaly temperature above which the electrical resistance increases markedly. Various means are disclosed for removing the PTC device when the current surge has passed, and several of these means also provide for reinserting the PTC device in the circuit when the D.C. operating voltage drops rapidly indicating the loss of line voltage or that an overload or short circuit has occurred.

In one preferred form this circuitry comprises an emitter follower coupled to a control relay under the control of a Zener diode to close normally open relay contacts, shunting the PTC device, when the D.C. voltage reaches a predetermined level, and to reopen these contacts when the D.C. voltage drops by a predetermined differential dictated by the voltage drop across the Zener and the drop out voltage of the relay.

Still other preferred embodiments utilize this emitter follower technique, and also employ a transistorized switching means responsive to D.C. output voltage when the PTC has been removed from the circuit. When this voltage drops, by an amount determined chiefly by the Zener voltage, the relay, or an SCR, reinserts the PTC to prevent the inrush current from damaging the diodes in the rectifier.

The general object of the present invention then is to provide a device for limiting inrush current upon turn on or upon transients, a device and circuitry for shunting the device out of the circuit except when required to provide protection against excessively high currents.

A more specific object of the present invention is to provide such a device in the form of a semiconductive PTC resistor, and to provide a circuit for inserting the PTC device not only at initial turn-on for limiting the current through a diode rectifier but also for selectively reinserting the PTC device when the D.C. voltage level drops rapidly.

DETAILED DESCRIPTION

Figure 1:
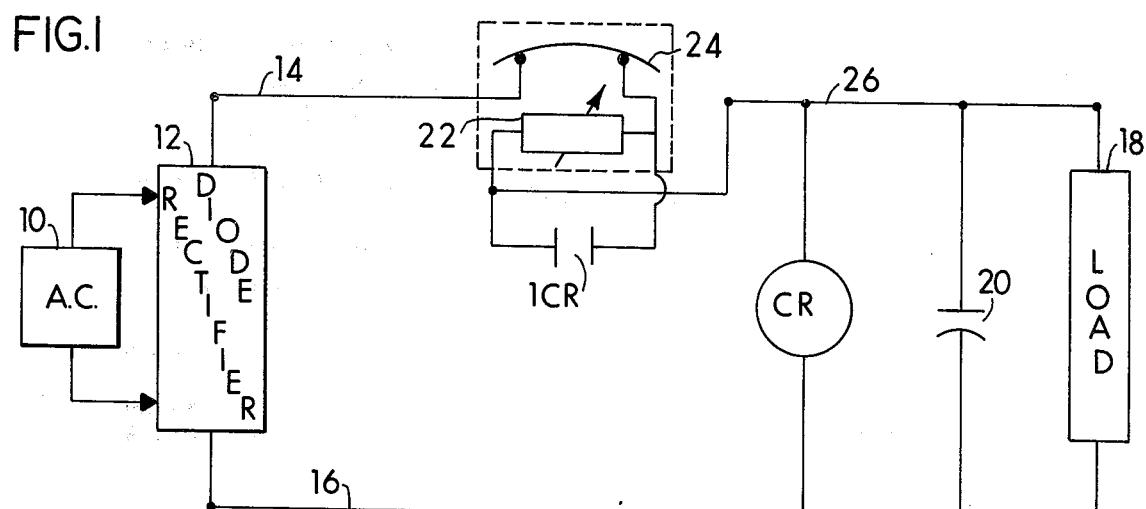
FIG. 1 is a schematic view of a circuit incorporating one form of the present invention, with some components being indicated in schematic fashion.

Turning now to the drawings in greater detail, FIG. 1 shows a source of A.C. electrical power 10 for operating a diode type rectifier 12 which may be of conventional construction including, for example, a bridge circuit defined by a plurality of diodes so as to provide a D.C. output voltage in lines 14 and 16. The D.C. output voltage from the rectifier is intended to operate an electrical load 18, and conventional filtering is provided in the form of one or more capacitors 20 to assure that D.C. voltage with a minimum of A.C. ripple reaches the load 18.

In accordance with the present invention a current inrush limiting circuit is provided between the D.C. output voltage of the rectifier 12, and the load associated capacitor 20, for eliminating or minimizing inrush current surge on the power line, through the rectifier, and to the load and filter.

In order to protect these components during initial turn-on an electrical resistance device 22 is provided in electrical series circuit with the load 18 and filter 20. Thus, current passes first across the closed contacts of a calibrated bi-metallic disc thermostat 24, and thence from right to left in FIG. 1 through the resistance element 22, back from left to right through the conductor 26 and to the capacitor 22 and load 18. Line 16 represents the return line. The resistive element 22 serves as a voltage divider in the turn-on condition, and will remain in the circuit as described until the voltage sensitive relay CR is energized. This relay CR will not be energized until the filter capacitor circuitry 20 has first charged to a voltage equal to that of the relay operating voltage.

Relay CR is arranged with its coil (not shown) in electrical parallel with respect to the load 18, and when the voltage in line 26 reaches a predetermined level, somewhat less than the output voltage produced by the rectifier 12, said relay CR is energized or pulls-in. The relay CR preferably comprises a device having a relatively high resistance. A pivotally mounted armature is adapted to be magnetized by an electromagnet. The pivoted armature is biased in one direction by a spring, the force of which spring can be adjusted manually to preset the voltage at which the relay coil pulls the armature in. As the voltage across the relay increases to a preset relay pull-in potential, the current in the relay coil increases, and the electromagnet overcomes the spring force pivoting the armature and mechanically closing normally open relay contacts 1CR. It is an inherent characteristic of such relays, however, that the drop-out voltage is less than the voltage necessary for pull-in. Thus, the relay CR will operate to reopen contacts 1CR when the voltage drops a predetermined amount.

By way of summary, in reference to FIG. 1, in case of a prolonged current surge during turn-on, caused either by a surge continuing for a longer than normal time, or if the system is turned on and off rapidly several times, the resistive device 22 can be expected to increase in temperature such that the thermostat element 24 functions in the the manner of a circuit breaker to interrupt the circuit and thereby avoid destroying the various components of the FIG. 1 circuit, particularly resistive device 22. It should be noted that the diodes in the rectifier unit 12 can be damaged by excessive temperature rise caused by repeated turn-on inrush current pulses. The circuit breaker 24 and the associated heater 22 can be designed to be a thermal analog of diode heating and hence protect the diodes by opening the circuit prior to excessive temperature rise.

Figure 2:
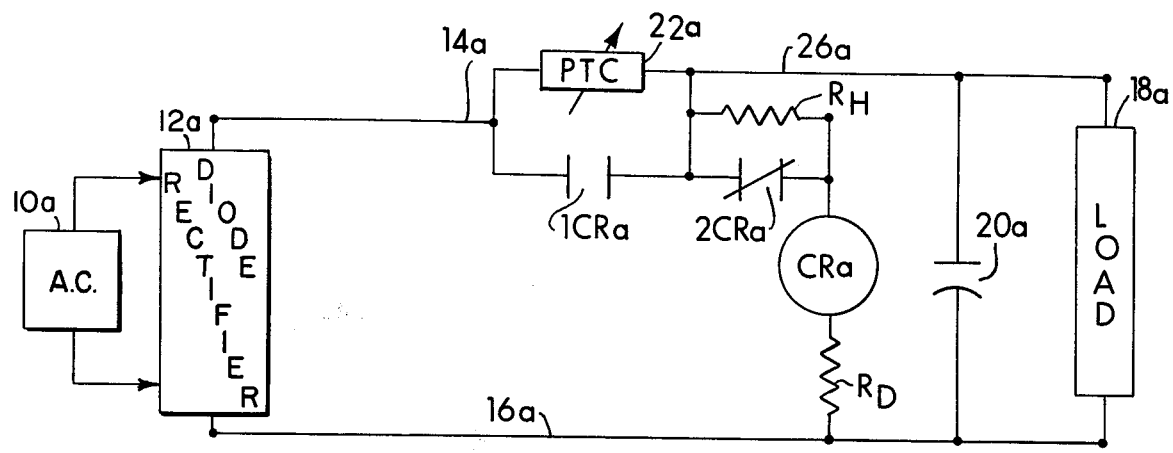
FIG. 2 shows an alternative embodiment of the present invention suitable for use in conjunction with high voltage power supplies and which reduces the apparent differential of the relay.

Turning next to a detailed description of the protective circuit shown in FIG. 2, the D.C. output voltage in line 14a passes through a resistive device 22a, which device preferably comprises a variable resistance semiconductive material exhibiting a steep positive temperature coefficient (PTC). That is, said element is made from a material, the resistance of which increases with temperature, at least through an upper region of its design operating range. The device 22a serves much the same function as the resistance 22 described hereinabove with reference to FIG. 1 in that such device 22a serves to limit the inrush current through the rectifier, and to the load and its associated capacitor during turn-on. When the voltage at the load associated end of the PTC device 22a reaches a predetermined level, with respect to the neutral line voltage potential 16a, a voltage sensitive relay CRa is energized or "pulls-in" closing a normally open set of contacts 1CRa, and shunts the resistive device 22a out of the circuit. A normally closed set of contacts 2CRa (to be described) will remain closed until the contacts 1CRa close. Thus the relay CRa is of the "make before break" type commonly referred to as a "form D" type of relay.

Any material which displays a relatively steep positive sloped resistivity-temperature curve can be used as a PTC material or resistive device in accordance with the present invention, and the reader is referred to issued U.S. Pat. No. 3,414,705 entitled "COMPONENT OVEN" for a more detailed description of the types of materials which are commonly utilized for achieving this positive temperature gradient or coefficient. Briefly, the resistance of such a device remains fairly stable through a lower temperature region, and when the temperature reaches its "anomaly" temperature the resistance increases at a relatively steep rate after which the resistance may again drop off with further temperature increases. For example, at ambient temperature (70°F) and when the circuit of FIG. 2 is initially closed, the resistance of the PTC device 22a is quite low. The power delivered to the capacitor 20a is initially relatively high as a result of the fact that the initial current is relatively high until the capacitor 20a approaches full charge. Should the load begin to draw excessive current or the high surge continues, then the PTC material begins to heat up to approach its anomaly temperature (approximately 200°F). At this point, the increased resistance will reduce the current allowed to pass through the PTC device, that is the power to the circuit will be limited as a result of the characteristics of the PTC device in spite of any tendency for the load to draw excessive current. This is a result of the fact that although the current varies directly with the voltage input, such current also varies inversely with resistance.

Still with reference to the FIG. 2 circuit, a voltage dropping resistor $R_D$ is provided in series circuit with the coil of the relay CRa to permit operation of the relay at a voltage level above the "pull-in" voltage of the relay itself. Thus, resistor $R_D$ is a voltage dropping resistor and permits use of a relay of somewhat less expensive construction in high voltage circuits than would be permitted without the use of the voltage dropping resistor $R_D$ in the circuit of FIG. 2.

A second resistor $R_H$ is provided in series circuit with the coil of the relay CRa, and this resistor $R_H$ is selectively placed into the circuit once the relay CRa has been energized. The normally closed contacts 2CRa no longer shunt resistor $R_H$, once the relay has been energized, and hence $R_H$ complements the voltage dropping resistor once the relay CRa has been energized. It will be apparent therefore, that the insertion of resistor $R_H$ will in fact permit the relay CRa to be interrupted, or dropped out, in response to a voltage in line 26a considerably higher than is the case, in the circuitry of FIG. 1. By way of example, in a test set up, a relay coil which normally pulls-in at 100 volts, and normally drops out at 30 volts, was configured through a circuit of the type shown in FIG. 2, to drop out at 70 volts with the selection of an appropriate resistance $R_H$ and $R_D$. Thus, the circuit of FIG. 2 avoids a disadvantage inherent in the wide bands between pull-in and "drop-out" voltages of a typical D.C. relay.

By way of summary then if the voltage in line 26a drops excessively, an indication of current surge or of loss of A.C. power to the rectifier, a PTC device 22a is placed in the circuit, and as a result current flows through the PTC device 22a and the turn-on condition is reestablished.

Figure 3:
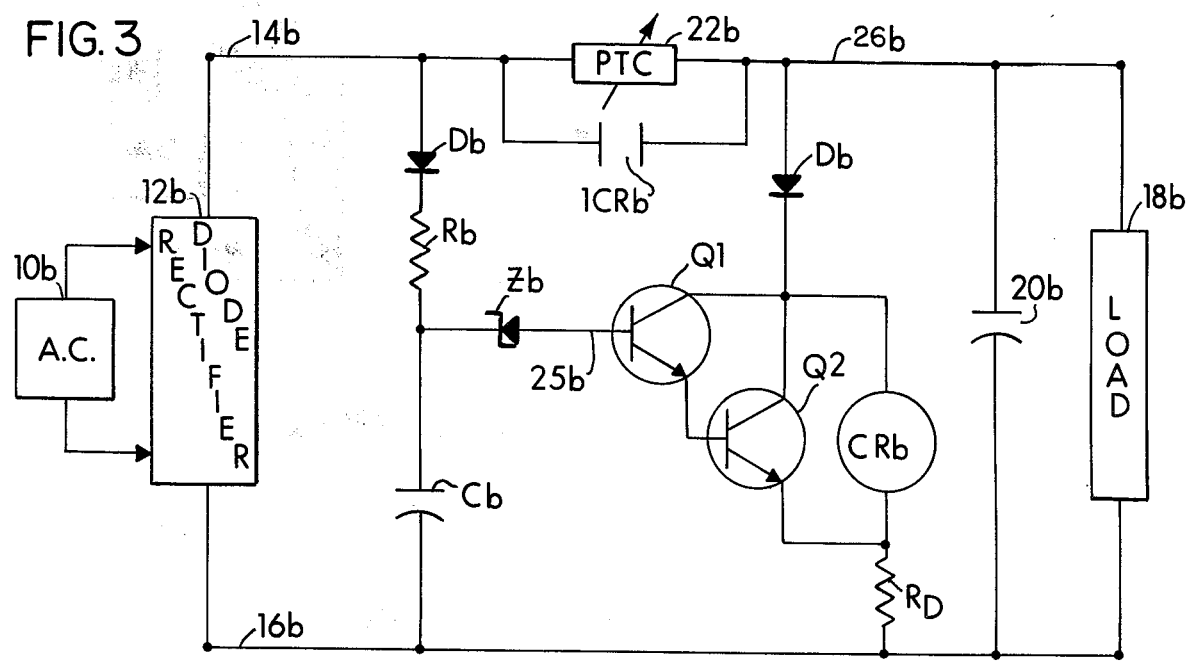
FIG. 3 shows a second alternative circuit arrangement of the present invention.
Figure 4:
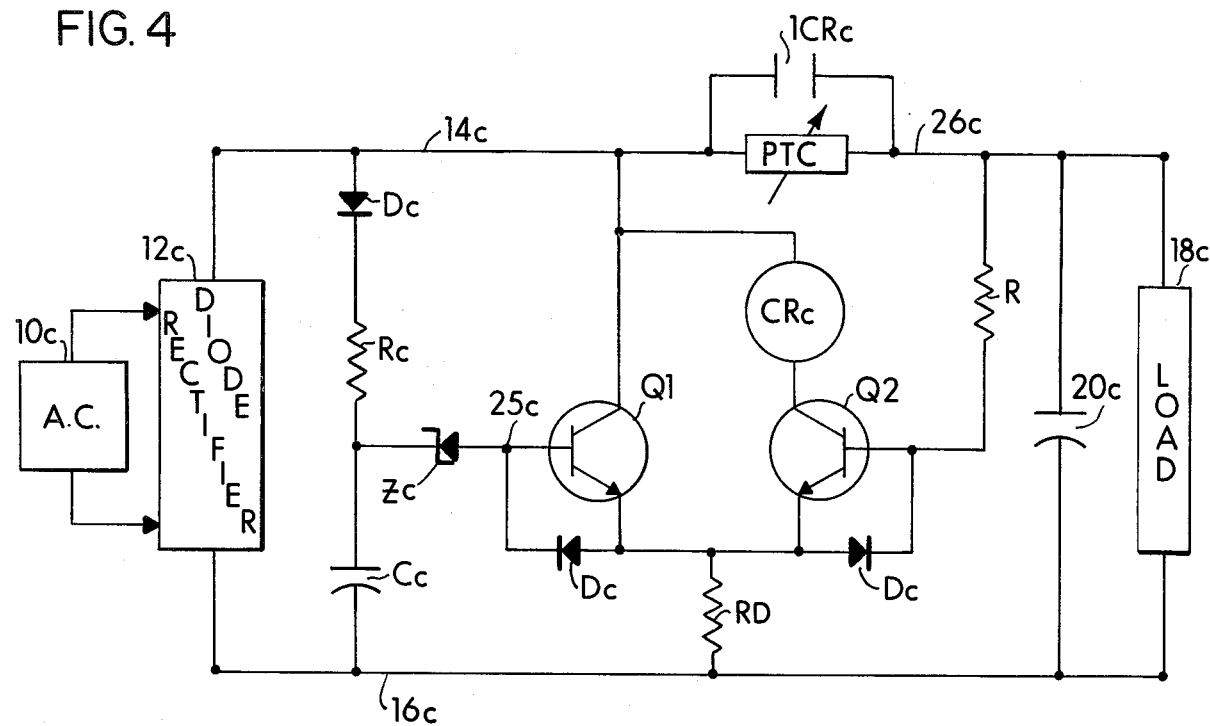
FIG. 4 shows a third alternative circuit incorporating the present invention.
Figure 5:
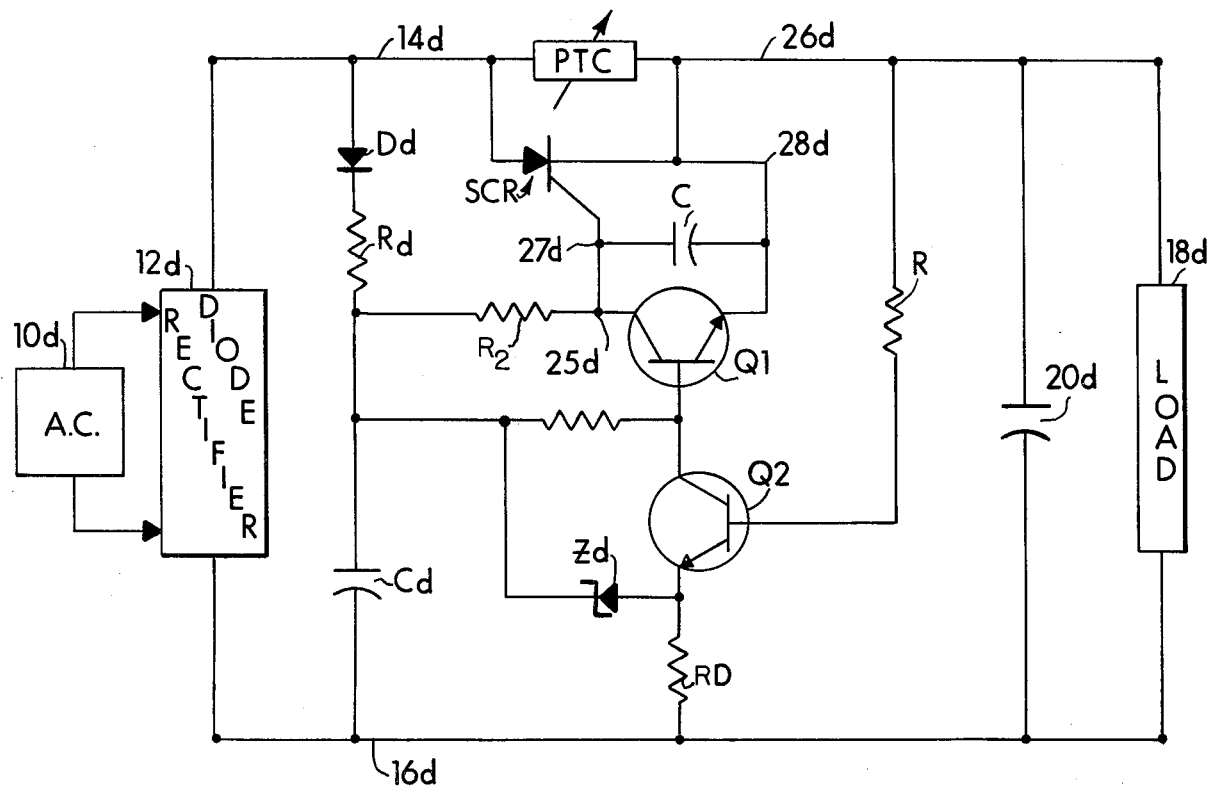
FIG. 5 shows a fourth alternative circuit arrangement incorporating the present invention.
Figure 6:
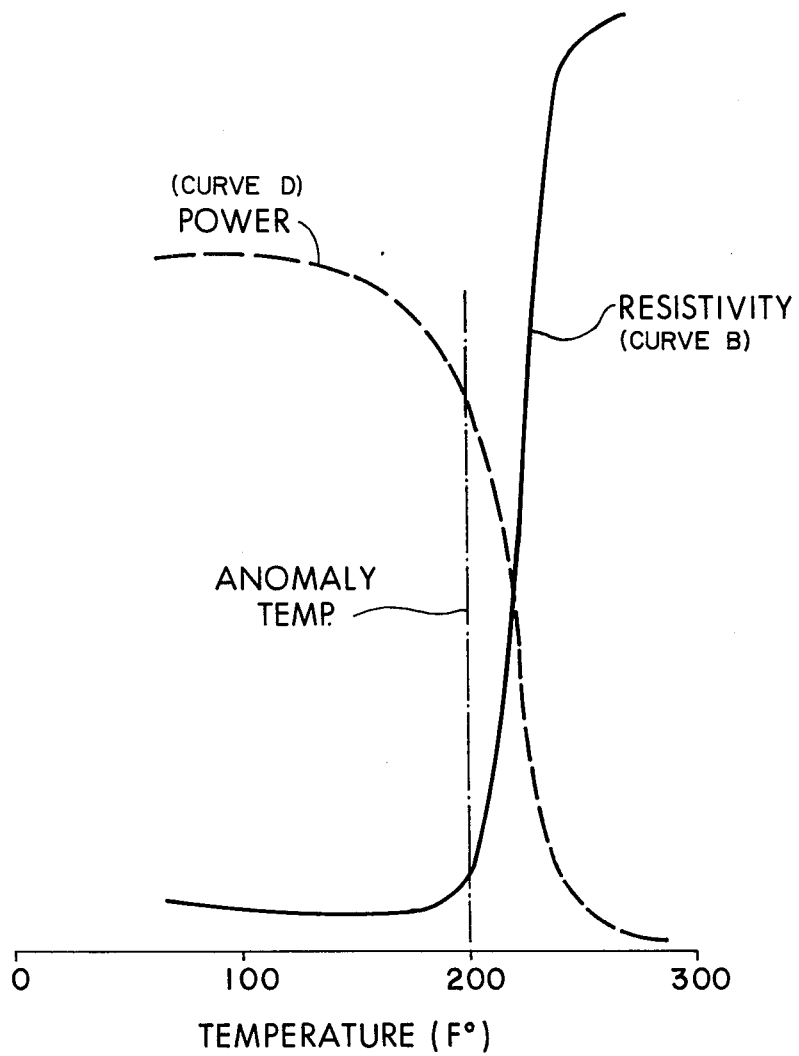
FIG. 6 shows the relationship between resistivity and temp for a PTC material and also the relationship between power and temp for a constant voltage source.

In FIGS. 3, 4 and 5, to be described hereinbelow, a more sophisticated approach is disclosed which is useful even with various nominal line voltages to limit inrush current to prescribed levels. Typically, the A.C. power supply may comprise voltages which vary from 208 volts A.C. to 240 volts A.C. These variations may extend from minus 15 to plus 6 per cent. In the circuits of FIGS. 3, 4 and 5 the rectifier may be connected to a single or multi phase A.C. source. The rectifiers may be either of the half wave or full wave type. The circuits of FIGS. 3, 4 or 5 are otherwise similar in function to those of FIGS. 1 and 2, in that the same basic purpose is still present, that is of limiting inrush current to the capacitor and load as well as limiting current through the rectifier.

Turning next to a detailed description of the circuitry shown in FIG. 3, a PTC device 22b is provided in electrical series circuit with both the load 18b and its associated filter capacitor 20b in order to limit inrush current until the coil or relay CRb is energized and its armature pulled in closing associated contacts 1CRb and thereby shunting the PTC device 22b out of the circuit. Considering the base-emitter loop of the Darlington pair amplifier Q1 and Q2, the voltage across resistor RD follows that of the base of Q1, which voltage is the same as that across capacitor Cb, less the Zener drop of Zb. Thus, the emitter of Q2 is held at a positive voltage with respect to the reference potential in line 16b. The voltage on Cb is essentially the peak voltage on line 14b, Rb chosen just high enough in resistance to limit the current through Db to safe levels. The relay CRb will pick up when the voltage at 26b exceeds the voltage across RD by an amount equal to the pull in voltage of CRb. The designer merely adjusts the pull-in voltage of relay CRb, the room temperature resistance of the PTC device 22b, and the drop of Zener Zb, to achieve a desired inrush current characteristic. Since the voltage on Cb is a measure of the input voltage on line 14b, the inrush current characteristics can be maintained within rather narrow limits even with broad variations in the actual magnitude of the A.C. input voltage. The circuit of FIG. 3 is also capable of reinserting the PTC device 22b into the circuit in the event of a momentary power drop off. Capacitor Cb is charged to a voltage level of approximately that in line 14b at initial turn-on. In the event of loss of line power the voltage across filter capacitor 20b drops quite quickly, while the voltage on capacitor Cb drops slowly as a result of the high impedance of the Darlington emitter follower configuration. If the loss of A.C. power exists long enough to drop the voltage on line 14b by an amount equal to or greater than the difference between the Zener voltage and the relay drop out voltage, relay CRb will be de-energized opening its associated contacts 1CRb reinserting the PTC device 22b into the circuit.

Finally, it should be mentioned that the Darlington pair amplifier Q1 and Q2 might be replaced by a single high gain transistor.

Now a detailed description of the circuitry shown in FIG. 4 will be given. As already mentioned in the previous paragraph, the single transistor Q1 might be replaced by a Darlington emitter follower. As in the previously described circuit the voltage across resistor RD follows that at the base 25c of Q1, which voltage is in fact that voltage across the capacitor Cc less the Zener voltage drop Zc.

Relay CRc of FIG. 4 has its coil connected in series to the collector terminal of transistor Q2 which is switched "on" by voltage in line 26c, through resistor R. Upon loss of power in the line 26c transistor Q2 switches "off". This will occur when the voltage in line 26c drops by an amount approximately equal to the Zener voltage Zc. As a result, the FIG. 4 circuit is relatively insensitive to the pull-in / drop-out differential, or band associated with D.C. relay CRc.

Turning next to a detailed description of the circuitry shown in FIG. 5, a silicon controlled rectifier SCR is provided in place of the D.C. relay of the previous circuits to selectively by-pass the PTC device 22d when the SCR is rendered conductive. Capacitor Cd charges rapidly through diode Dd and through its associated resistor Rd upon initial turn on, and, transistor Q1 is saturated, holding the gate to cathode voltage of the SCR below the turn-on threshold. As the filter capacitor 20d charges and rises above the voltage on resistor RD a transistor switch Q2 is rendered conductive, turning the SCR associated transistor Q1 off which in turn causes the SCR to conduct.

The circuitry of FIG. 5 is also designed to reinsert the PTC device in the circuit when the line voltage drops below a predetermined minimum level. More particularly, if the voltage in line 14d drops suddenly the SCR will be back biased and cease conduction, the voltage in line 26d will drop more than the Zener voltage Zd, switching transistor Q2 off and turning transistor Q1 on upon reapplication of power to the circuit. Thus, the PTC device 22d will be reinserted in the circuit and limit inrush current not only to the filter capacitor 20d but also through the rectifier 12d.

We claim:
1. A protective circuit connecting a D.C. voltage source of output voltage V to a load, comprising:
   electrical resistance means in series with the load to limit start up current to the load, said resistance means having a relatively constant resistance at temperatures below an anomaly and a steeply-sloped positive temperature coefficient (PTC) of resistivity at temperatures above the anomaly,
   voltage sensitive means in parallel with the load and having an output signal for shunting and resistance means out of the circuit,
   said voltage sensitive means so constructed as to provide said output signal only when the voltage sensed reaches a predetermined level somewhat less than V, and
   a thermally responsive switching means in series with and located adjacent said resistance means, said switching means serving to break said circuit when the temperature of said resistance means exceeds a predetermined level.

2. A protective circuit connecting a D.C. voltage source of output voltage V to a load, comprising:
   electrical resistance means in series with the load to limit start up current to the load to limit start up current to the load, said resistance means having a relatively constant resistance at temperatures below an anomaly and a steeply-sloped positive temperature coefficient (PTC) of resistivity at temperatures above the anomaly, and
   voltage sensitive means in parallel with the load and having an output signal for shunting said resistance means out of the circuit,
   said voltage sensitive means so constructed as to provide said output signal only when the voltage sensed reaches a predetermined level somewhat less than V,
   said voltage sensitive means comprises a relay with its coil in parallel with said load, and wherein said output signal comprises at least one set of contacts which are normally open and electrically closed by an armature when said coil senses a voltage above its pull-in potential, said contacts being in parallel with said resistance means, and
   a holding circuit, said relay means having normally closed contacts in said holding circuit, said normally closed contacts open only after said normally open contacts close, a resistor in said holding circuit and adapted to be shunted out of said holding circuit when said normally closed contacts so open to interrupt electrical operation of said armature at a voltage level relatively close to said relay armature pull-in potential.

3. The circuit according to claim 2 wherein a voltage dropping resistor is provided in series with said relay coil to permit said relay armature to be pulled in at a known voltage significantly less than that sensed.

4. A protective circuit connecting a D.C. voltage source of output voltage V to a load, comprising:
   electrical resistance means in series with the load to limit start up current to the load, said resistance means having a relatively constant resistance at temperatures below an anomaly and a steeply-sloped positive temperature coefficient (PTC) of resistivity at temperatures above the anomaly, and
   voltage sensitive means in parallel with the load and having an output signal for shunting said resistance means out of the circuit,
   said voltage sensitive means so constructed as to provide said output signal only when the voltage sensed reaches a predetermined level somewhat less than V,
   said voltage sensitive means comprises a relay with its coil in parallel with said load, and wherein said output signal comprises at least one set of contacts which are normally open and electrically closed by an armature when said coil senses a voltage above its pull-in potential, said contacts being in parallel with said resistance means, and
   a transistor switch in series with said relay coil.

5. A protective circuit connecting a D.C. voltage source of output voltage V to a load, comprising:
  electrical resistance means in series with the load to limit start up current to the load, said resistance means having a relatively constant resistance at temperatures below an anomaly and a steeply-sloped positive temperature coefficient (PTC) of resistivity at temperatures above the anomaly, and
  voltage sensitive means in parallel with the load and having an output signal for shunting said resistance means out of the circuit,
  said voltage sensitive means so constructed as to provide said output signal only when the voltage sensed reaches a predetermined level somewhat less than V,
  said voltage sensitive means comprises an SCR with its anode and cathode so connected as to selectively conduct shunting said PTC element out of the circuit, a trigger circuit for causing said SCR to conduct and including a first transistor switch for permitting said output signal when said first transistor switch is not saturated, and a base drive circuit for said first transistor switch responsive to the voltage at the load side of said PTC element to switch said first transistor switch off and to trigger said SCR to conduct when said voltage reaches said predetermined level somewhat less than V.

6. The circuit according to claim 5 wherein said first transistor switch base biasing circuit includes a second transistor switch the collector of which is connected to the base of said first switch, and said voltage sensitive means further including a resistance line from the load side of said PTC element to said second transistor switch base to drive said second switch to saturation and to trigger said SCR to conduct when said voltage reaches said predetermined level somewhat less than V.

7. A protective circuit connecting a D.C. voltage source of output voltage V to a filter capacitor, comprising:
  a. electrical resistance means in series with the filter capacitor to limit surge current thereto, said resistance means having a relatively constant resistance at temperatures below an anomaly and a steeply-sloped positive temperature coefficient (PTC) of resistivity at temperatures above the anomaly,
  b. voltage sensitive means in parallel with the filter capacitor and having an output signal for shunting said resistance means out of the circuit,
  c. said voltage sensitive means so constructed as to provide said output signal only when the voltage sensed reaches a predetermined level somewhat less than V.

8. The circuit according to claim 7 further characterized by a thermally responsive switching means in series with and located adjacent said resistance means, said switching means serving to break said circuit when the temperature of said resistance means exceeds a predetermined level.

9. The circuit according to claim 7 wherein said voltage sensitive means comprises a relay with its coil in parallel with said filter capacitor, and wherein said output signal comprises at least one set of contacts which are normally open and electrically closed by an armature when said coil senses a voltage above its pull-in potential, said contacts being in parallel with said resistance means.

* * * * *